(12) United States Patent
Katayama et al.

(10) Patent No.: US 6,421,893 B1
(45) Date of Patent: Jul. 23, 2002

(54) PRODUCTION LINE OF CAR COMPONENT (75) Inventors: Kou Katayama; Yukimitsu Awa, both of Suzuka (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/528,985

(22) Filed: Mar. 20, 2000

(30) Foreign Application Priority Data

Mar. 19, 1999 (JP) .......................................... 11-076909

(51) Int. Cl.⁷ .......................... B23P 21/00; B25B 27/14; B23K 37/04
(52) U.S. Cl. .......................... 29/33 K; 29/771; 29/788; 29/796; 219/121.31; 228/6.1
(58) Field of Search .................. 29/33 K, 788, 29/785, 791, 792, 711, 771, 822, 823; 228/4.1, 6.1, 102; 219/80, 121.6, 121.31, 121.63, 121.64; 198/346.1, 346.2, 345.1

(56) References Cited

U.S. PATENT DOCUMENTS

| | | | | |
|---|---|---|---|---|
| 4,682,722 A | * | 7/1987 | Bossotto et al. | 228/4.1 |
| 4,740,133 A | * | 4/1988 | Kawano | 228/176 |
| 4,928,383 A | * | 5/1990 | Kaczmarek et al. | 29/711 |
| 5,186,304 A | * | 2/1993 | Kaczmarek et al. | 29/785 |
| 5,188,276 A | * | 2/1993 | Furuya et al. | 228/6.1 |
| 5,380,978 A | * | 1/1995 | Pryor | 219/121.6 |
| 5,424,505 A | * | 6/1995 | Kiyota | 219/86.25 |
| 6,029,334 A | * | 2/2000 | Hartley | 29/464 |
| 6,112,390 A | * | 9/2000 | Takeda et al. | 29/33 K |

FOREIGN PATENT DOCUMENTS

| | | | | |
|---|---|---|---|---|
| JP | 1-101279 | * | 4/1989 | 29/33 K |
| JP | 5-124550 | * | 5/1993 | 29/33 K |
| JP | 11-333535 | * | 12/1999 | 29/33 K |
| JP | 2000-42657 | * | 2/2000 | 29/33 K |

* cited by examiner

Primary Examiner—William Briggs
(74) Attorney, Agent, or Firm—Arent Fox Kintner Plotkin & Kahn, PLLC (57) ABSTRACT

A production line for assembling a pair of left and right car components, capable of assembling a pair of high quality car components by on line at high operating efficiency and productivity and capable of controlling jigs and molds with high dimensional accuracy. The production line of this invention related to a production line for assembling a pair of left and right front doors for supply to an assembly line of the white body of a car, is constructed by arranging various processes on one line, which comprises a work tack welding process A comprising a work input device 3 for alternately inputting the left right front door panels LDP and RDP, an incremental welding process B for welding either one of the works while transferring the other, a marriage process C, a door skin input and sealing process D, a hemming process E, a hemming delivery process F, and a front door delivery portion.

5 Claims, 12 Drawing Sheets

PRODUCTION LINE OF CAR COMPONENT

BACKGROUND OF THE INVENTION

1. Field of the Invention

The present invention relates to an production line of a car component, and especially relates to a production line for producing car doors by welding.

2. Background Art

Conventionally, when producing a car, especially when assembling a white body by welding prior to painting, it is necessary to input a pair of left and right car body components constituting the white body at the same time.

Compared with large components such as a body side assembly or a floor assembly, since car components such as a front door and a rear door are sub-assembled by a number of processes, and since the right hand and the left hand doors are shaped into different forms even though they are mirror images, those doors have been normally produced by separate lines.

Practically, the front doors are produced as follows. The front door comprises a door panel as an inner member, a door skin as an outer member, a door sash member, and a hinge mount reinforcing member and thus, the production of the door requires the assembly of numerous elements in a number of assembly processes. At the same, since the door forms part of the outer body of the car which attracts much attention, and since it is necessary to form a clear parting line between the body side assembly and the car door, the car door must be formed very accurately. In addition, the production of the car door necessitates a numerous welding processes so that the door skin is joined to the inner door panel by hemming processing and the periphery of the hemming processed door assembly is welded for integrating both door panel and the door skin.

However, when the front doors and the rear doors are produced by the respective separate lines, a problem arises in that the working efficiency, in other words, the productivity of car doors, is low, and the cost of equipment becomes high. That is, separate production lines for right and left doors which are different in shape but require the same production processes using the same production machines, lower the production efficiency and productivity and raises the cost of equipment.

Furthermore, another problem arises, if the left and right doors are produced by two different lines in synchronism with each other for producing both doors at the same accuracy, it becomes necessary to synchronize both production lines as much as possible, which leads to complicated operation controls.

The other problem in producing left and right doors in separate lines is that, although similar jigs and molds are used in those lines, it is difficult to control and to preserve high dimensional accuracy of jigs and molds for separate lines.

SUMMARY OF THE INVENTION

It is therefore an objective of the present invention to provide a production line which is capable of producing a pair of car components, with high operating efficiency and high productivity, and is also capable of producing high quality products while managing the jigs and molds at high accuracy.

According to the first aspect of the present invention, a production line of a car component for manufacturing a pair of left and right car components of a car body comprises: a work supplying portion for alternately supplying two types of works; a transfer and processing portion for processing one of the works while transferring another; wherein said work supplying portion and said transfer and processing portion are arranged to form one production line by addition of a finished car component delivery portion.

The production line according to the first aspect makes it possible to assemble a pair of left and right works simultaneously by one line through transfer, processing, and delivery portions to the left and right door assemblies for delivering to the white body assembly line.

According to the second aspect of the present invention, the work supplying portion comprises a turn table (for example, the turn table 1 in the embodiment), which can turn to the work input portion, and first jigs for mounting the left and right works, and second jigs (for example, the setting jigs 2 in the embodiment) for positioning and attaching welding parts to be welded to the left and right doors, wherein said turntable and first and second jigs constitute a work tack welding process together with welding robots (for example, the welding robot 4 in the embodiment) arranged around said turntable.

The production line according to the second aspect makes it possible to assemble the left and right door assemblies very efficiently, since the left and right works are mounted alternately on a first jig by turning the turning tables, and when one of the left or right work is delivered after being welded by the welding robot, another work is supplied for welding by the turning of the turntable.

According to the third aspect, said transfer and processing portion comprises an incremental welding process for incremental welding of said first work and said welding parts at the tack welded state, a marriage process for combining said first work with a second work to be integrated with said first work, and a hemming process for integrating said first and second works by bending either one periphery of said first and second works.

The production line according to the third aspect makes it possible to process one of the left and right works, while transferring another one of the left and right works in the incremental welding process, in the marriage process and in the hemming process, respectively. Since the respective transfer periods of these processes are loss periods in the production line, elimination of the loss time effectively improves the productivity.

According to the fourth aspect, the car component comprises a pair of front doors or a pair of rear doors.

Formation of the production line according to the fourth aspect makes it possible to reduce the assembly period of both left and right front door assemblies or both left and right rear door assemblies. Furthermore, the above production line makes it possible to ensure the dimensional accuracy of these door assemblies, which is desirable because these door assemblies turn out to include the outer panel which determine the quality of the car appearance.

According to the fifth aspect, said works comprise the inner member or the outer member of the front door and rear door, said welding parts comprise a door sash member and a door hinge mount reinforcing member, and said attachment members comprise the inner member and outer member of the front door or the rear door.

The production line according to the fifth aspect makes it possible to assemble the left and right door assemblies in one line by combining the inner panel member or an outer panel member of the front or rear door with various welded parts comprising a door sash member or a door hinge mount reinforcing member.

DETAILED DESCRIPTION OF THE INVENTION

Hereinafter, an embodiment of the first embodiment will be described with reference to the attached drawings.

Figure 1:
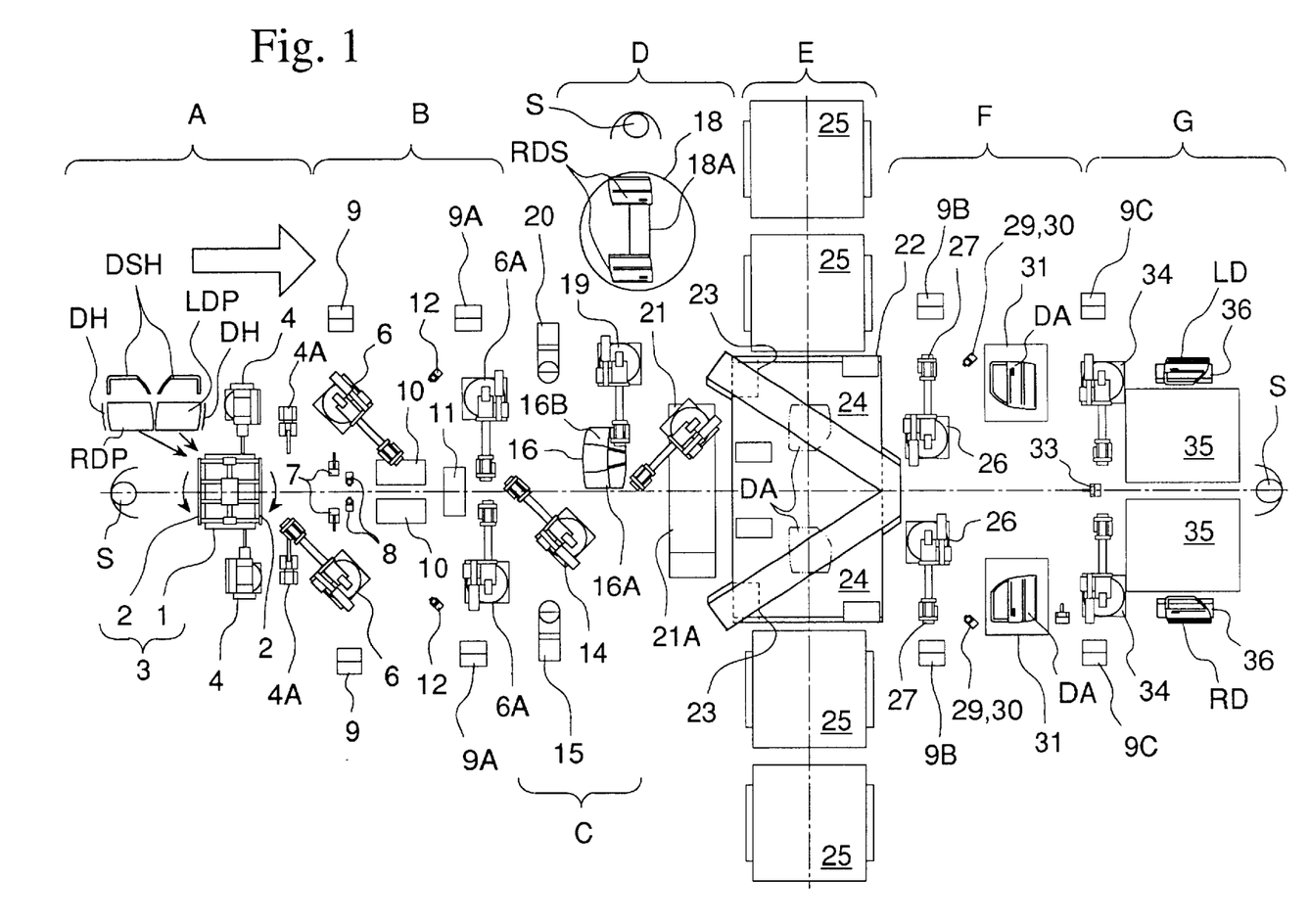
FIG. 1 is a diagram showing the outline of weld assembly line of a front door.

An outline of the present production line is first described as a whole. FIG. 1 is a diagram showing the outline of weld assembly line of a front door. A pair of left and right front doors LD and RD produced by this welding and assembling line is supplied to the weld assembly line of white bodies.

The above welding assembly line is constructed by linear arrangements of a tack welding process A, an incremental spot welding process B, a marriage process C, a door skin input and sealing process D, a hemming process E, a hemming delivery process F, and a hinge fixing process G. In this production line, the left side door and the right side door are manufactured simultaneously, that is, at the same time.

Each pair of a hinge mount reinforcing member DH and a door sash member DSH, supplied into the tack welding process A for the works, are tack welded to a left side door panel LDP and a right side door panel RDP supplied alternately to the tack welding process A of the works after positioning. The above left and right door panels LDP and RDP are inner panels for constituting the door assembly DA by assembly later with the door skins DS.

The left and right door panels LDP and RDP transferred to the incremental spot welding process B are subjected to the incremental spot welding to weld with incremental spots and transferred to the marriage process C. While these left and right door panels DP are transferred to the marriage process C, the left and right door skins LDS and RDS corresponding to the outer door panel members after the seal processing at the door skin input and sealing process D are transferred to the marriage process C. In this marriage process C, the door skins DS and the door panels are respectively combined for composing the door assembly DA.

The left and right door assemblies DA composed at the marriage process C are alternately transferred to the hemming process E for hemming processing of the peripheries of these door skins DS and transferred to the hemming delivery process F. The door assemblies DA are then subjected to the welding after hemming processing and are transferred to the hinge fixing and delivery process G. A door hinge (not shown) is fixed to each door assembly DA at the hinge fixing and delivery process G and both left and right door assemblies DA are delivered from the hinge fixing and delivery process G.

Hereinafter, these processes are described separately in detail with reference to FIGS. 2 to 21.

[Work Tack Welding Process A]

Figure 2:
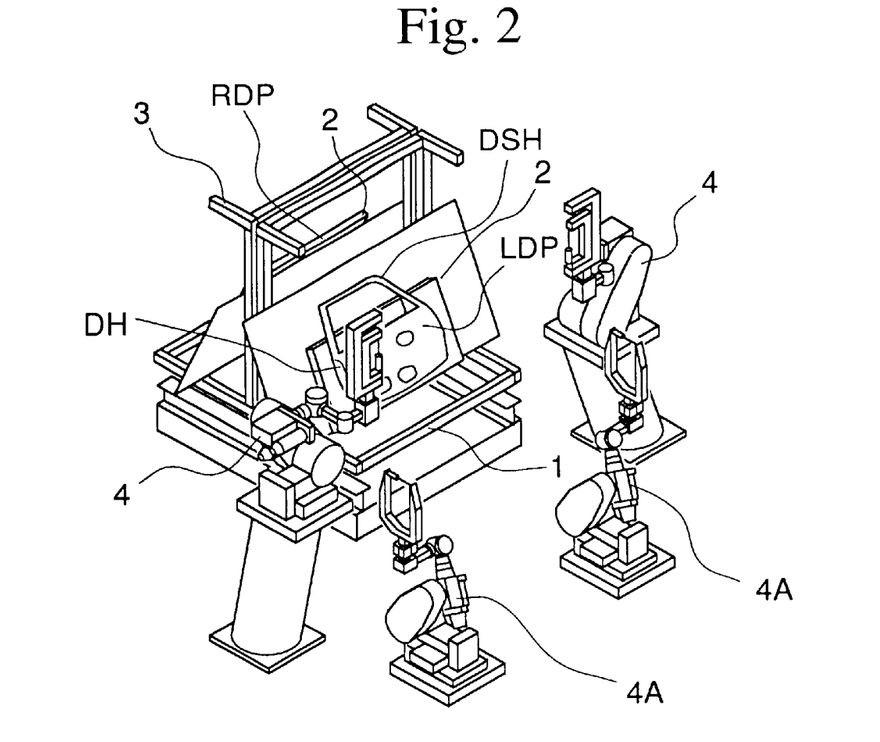
FIG. 2 is a perspective diagram showing an input apparatus of a work.

As shown in FIG. 2, the work tack welding process A comprises a work input device 3. The work input device 3 is provided with setting jigs 2 on the turn table 1, and the left and right door panels are mountable on these setting jigs 2. This work input device 3 allows an operator S to mount the left door panel LDP and the right door panel RDP alternately on each setting jig by turning the turn table which can turn towards the operator.

The hinge mount reinforcing member DH and the door sash member DSH are separately supplied to the setting jigs of the work input device 3, and both of the hinge mount reinforcing member DH and the door sash member DSH are positioned and tack welded by a welding device (not shown) mounted on the setting jig 2 to the left and right door panels LDP and RDP. Two pairs of welding robots 4 and 4A are arranged respectively on both sides of the work input device 3 and each pair of two welding robots executes welding of door panels gripped by the material handling robot 6 used in the incremental spot welding process B.

Accordingly, the left door panel LDP and the right door panel RDP are supplied to a single work input device 3 by an operator S and both panels LDP and RDP are tack welded. During the welding of either one of the left or the right door panels by the welding robots 4 and 4A, another door panel already welded is delivered from the setting jig 2 by the material handling robot 6. After the delivery of either one of the left and the right door panels DP, a new door panel corresponding to the left or the right door panels LDP or RDP is supplied to the work input device 3.

As shown, since one of two door panels are transferred or welded, while another one is welded or transferred, the hinge mount reinforcing member DH and the door sash member DSH can be tack welded to the left and right door panels LDP and RDP efficiently without time loss. And this operation can be executed by a single work input device 3 and by a single operator S.

[Incremental Spot Welding Process B]

Figure 3:
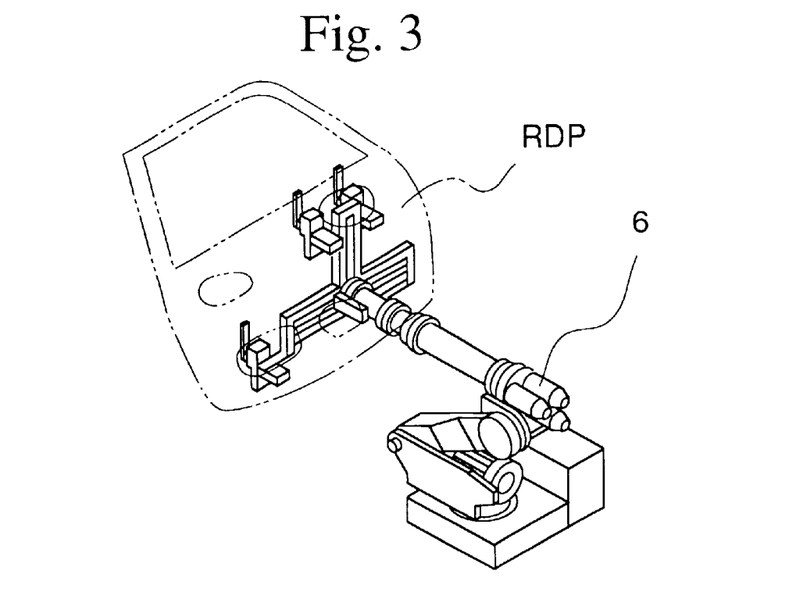
FIG. 3 is a perspective view showing a material handling robot.
Figure 5:
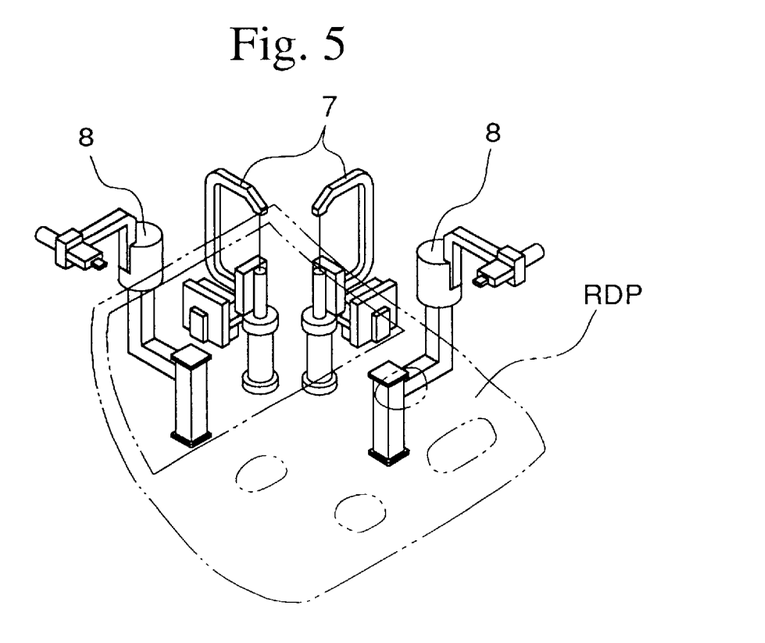
FIG. 5 is a perspective view showing fixed welding guns and dressers.

As shown in FIG. 3, the incremental spot welding process B comprises a pair of material handling robots disposed on both sides of the process line and fixed welding guns 7 shown in FIG. 5. The material handling robots 6 (the same as those described later) are constructed so as to turn the arm around the base and the turning diameter of the arm can be extended by extending the joint.

Figure 6:
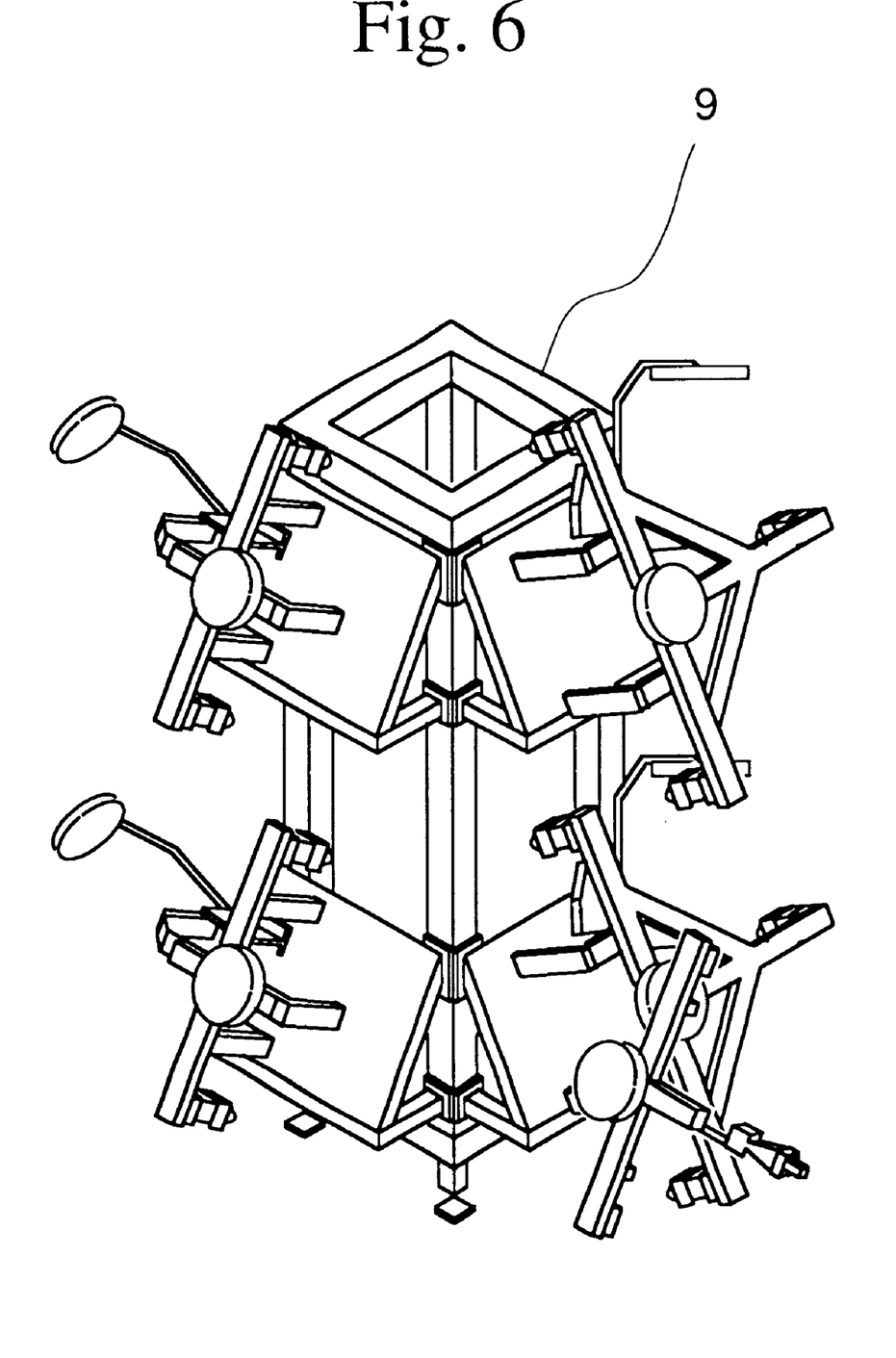
FIG. 6 is a perspective view showing jig magazines for the robot hand.

The numeral 8 in FIG. 5 denotes a dresser of the fixed welding gun 7. FIG. 6 shows a robot handling jig magazine 9 of the material handing robot 6. The robot handling jig magazine 9 includes jigs for the left and right door panels LDP and RDP as well as jigs for other types of door panels.

At the delivery side of the fixed welding gun 7, a pair of panel temporary mounting desks 10 for temporarily storing the left and right door panels after incremental welding are arranged on both sides of the line. Here, the setting jig 2 in the tack welding process A, the fixed welding gun 7, and the panel temporary mounting desk 10 are placed so as to execute the welding operation with a turning movement of the turning arm of the material handling robot 6.

Figure 4:
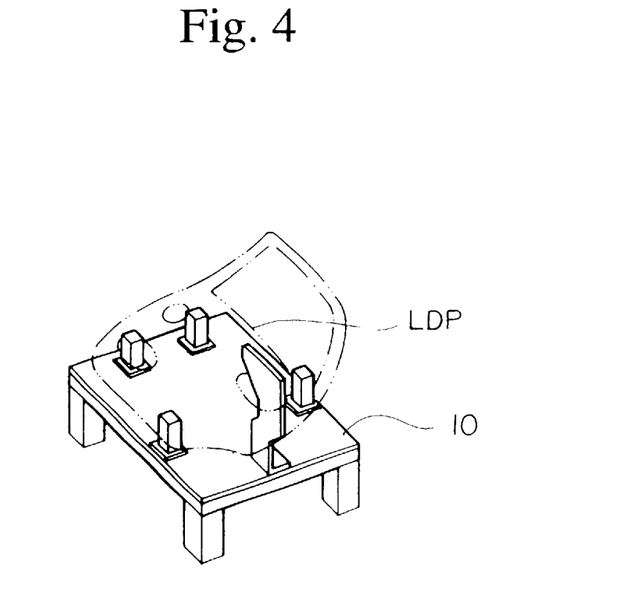
FIG. 4 is a perspective view showing a temporary mounting desk for the work.

At the delivery side of the panel temporary mounting desk 10, a temporary mounting desk 11 is arranged which has approximately the same structure as that shown in FIG. 4 with jigs common to the left and right door panels LDP and RDP. At the delivery side of this temporary mounting desk, a pair of material handling robots 6A, the same as that shown in FIG. 3, is arranged on both sides of the line. The fixed welding gun 12 for incremental welding is arranged on the movement locus of these material handling robots 6A. Hence, the right and left door panels DP mounted on the panel temporary mounting desk 10 are subjected to incremental welding while they are held by the material handling robots 6A for transferring to the temporary mounting desk 11. The material handling robots 6A are also provided with a robot handling jig magazine 9A similar to the robot handling jig magazine 9 shown in FIG. 6.

Accordingly, when either one of the door panels are subjected to the incremental welding, another one of the door panels is mounted on the panel temporary mounting desk 11. When one door panel is transferred to the next process, another panel is placed on the temporary mounting desk 11. Consequently, since one door panel is placed on the temporary mounting desk 11 while another door panel is transferring, it is sufficient to provide only one temporary mounting desk.

[Marriage Process C]

Figure 7:
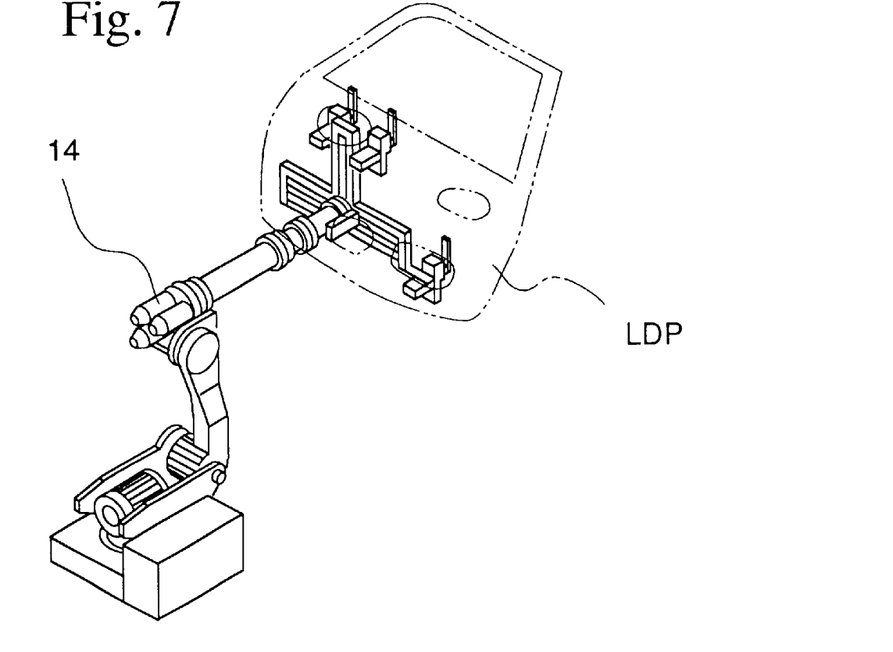
FIG. 7 is a perspective view showing a marriage robot.

The marriage process C comprises a marriage robot 14. This marriage robot 14 carries the left door panel or the right door panel DP mounted on the temporary mounting desk 11 to either one of mounting locations 16A and 16B of the marriage desk 16 through a sealing gun 15 shown in FIG. 8.

Figure 8:
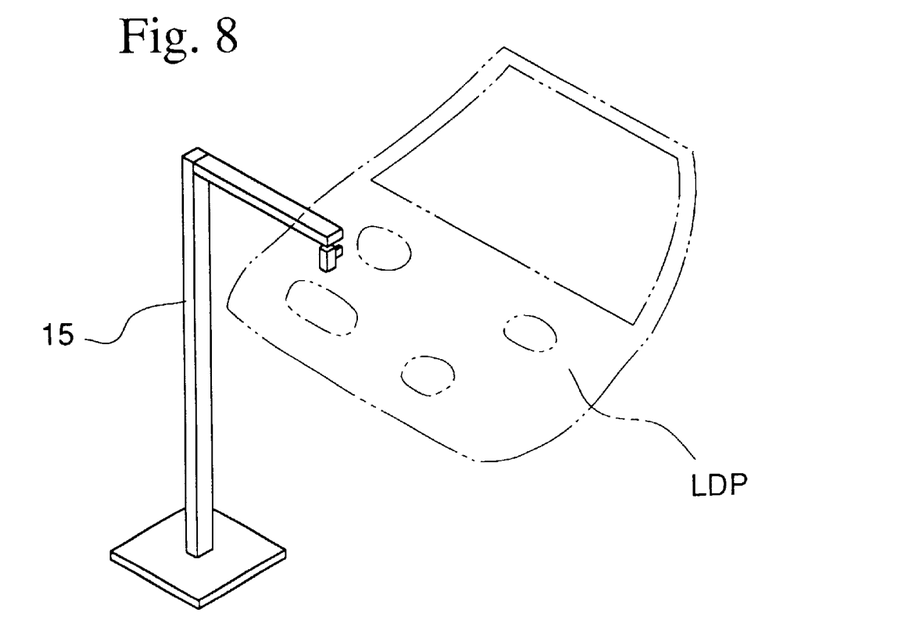
FIG. 8 is a perspective view showing a sealing gun.

Therefore, the temporary mounting desk 11, the sealing gun 15, and the marriage desk 16 are arranged on the transfer locus of the marriage robot 14. The door panel DP on the temporary mounting desk 11 is gripped by the marriage robot 14. A sealing agent is coated on desired spots of the door panel DP by the sealing gun 15 while the door panel is gripped by the marriage robot 14 and while the arm of the marriage robot 14 turns.

The left and right door skins DS transferred from the door skin input and sealing process D are alternately mounted on the mounting locations 16A and 16B of the marriage desk 16 before mounting the door panels DP.

[Door Skin Input and Sealing Process D]

In the door skin input and sealing process D, the left and right door skins DS are alternately input to the marriage desk 16 from the directions perpendicular to the production line for mounting the door skin DS on the mounting positions 1 of the marriage desk before mounting the door panels DP.

Figure 9:
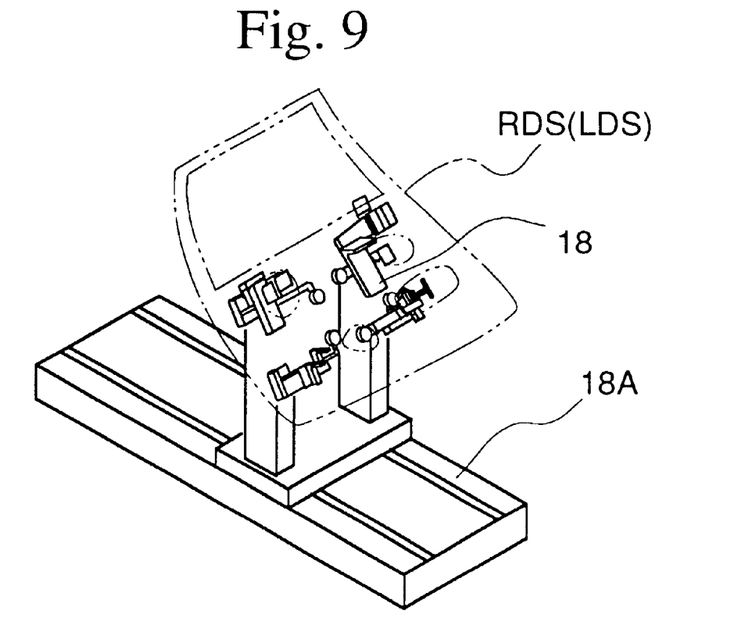
FIG. 9 is a perspective view of a positioning device.
Figure 10:
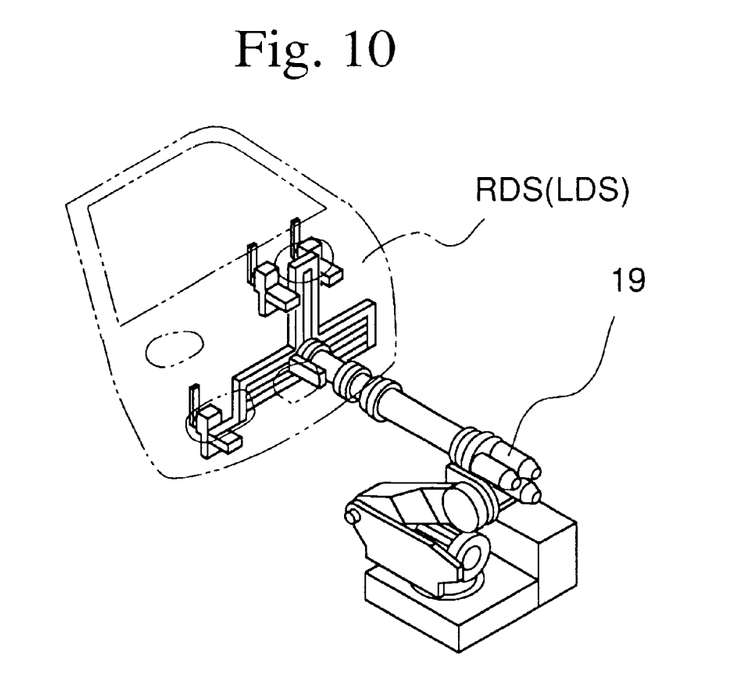
FIG. 10 is a perspective view of a material handling robot.
Figure 11:
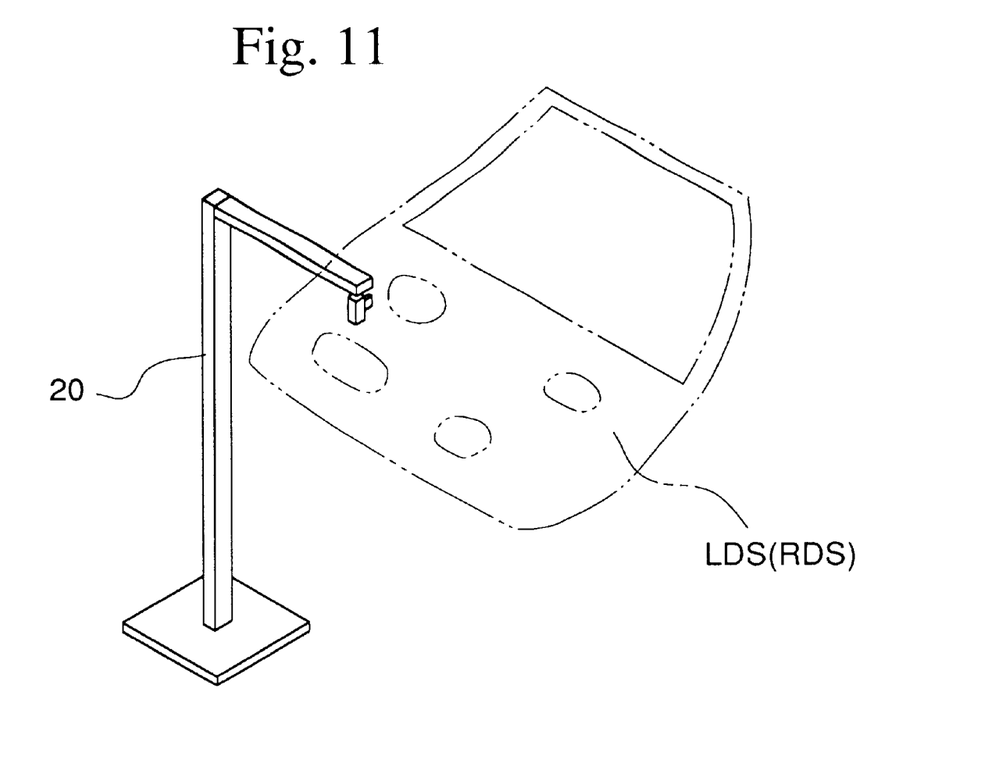
FIG. 11 is a perspective view showing a sealing unit.

As shown in FIG. 9, the door skin input and sealing process D comprises a positioning device 18, a material handling robot 19 shown in FIG. 10 for holding the positioning device with the door skin DS, and a sealing unit 20 for coating a sealing agent to the door skin DS while it is held by the material handling robot 19.

This material handling robot 19 transfers the door skin DS coated with the sealing agent to the above-described marriage desk 16 and mount the left door skin LDS and the right door skin RDS on the mounting locations 16A and 16B of the marriage desk 16 before mounting the door panels DP.

The positioning device 18 is designed so as to displace the door skin DS by sliding along the base 18A toward the center of the production line.

The positioning device 18, the sealing unit 20, and the marriage desk 16 are arranged on the transfer locus of the material handling robot 19, and the door skin DS is mounted on the mounting locations 16A and 16B of the marriage robot 16 by one turning movement of the robot arm of the material handling robot 19.

Figure 12:
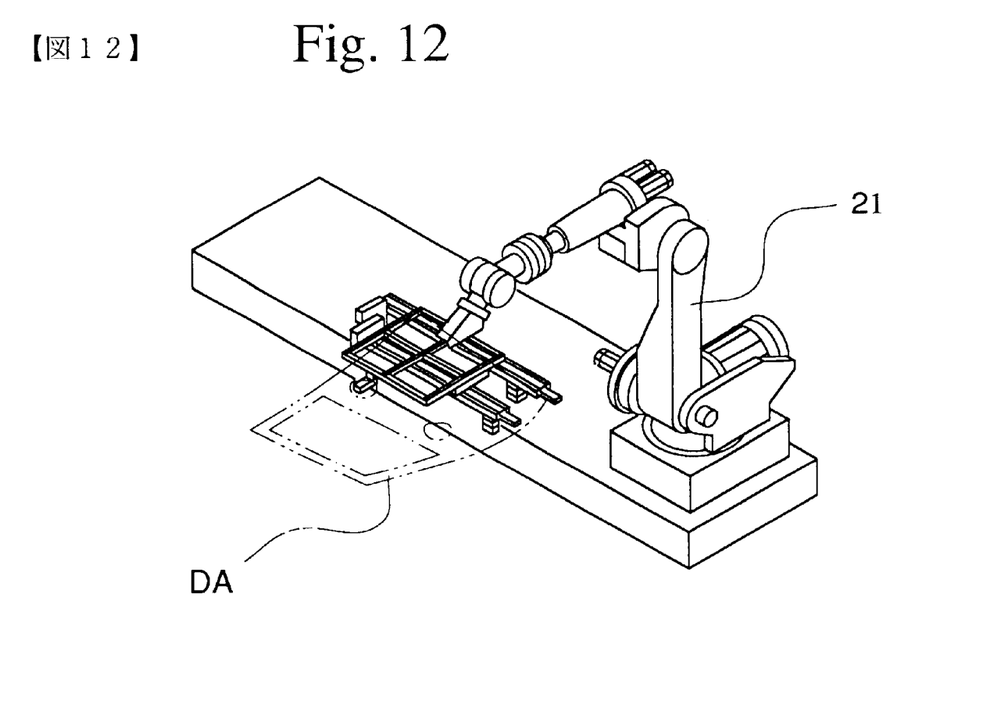
FIG. 12 is a perspective view showing a hemming input robot.
Figure 13:
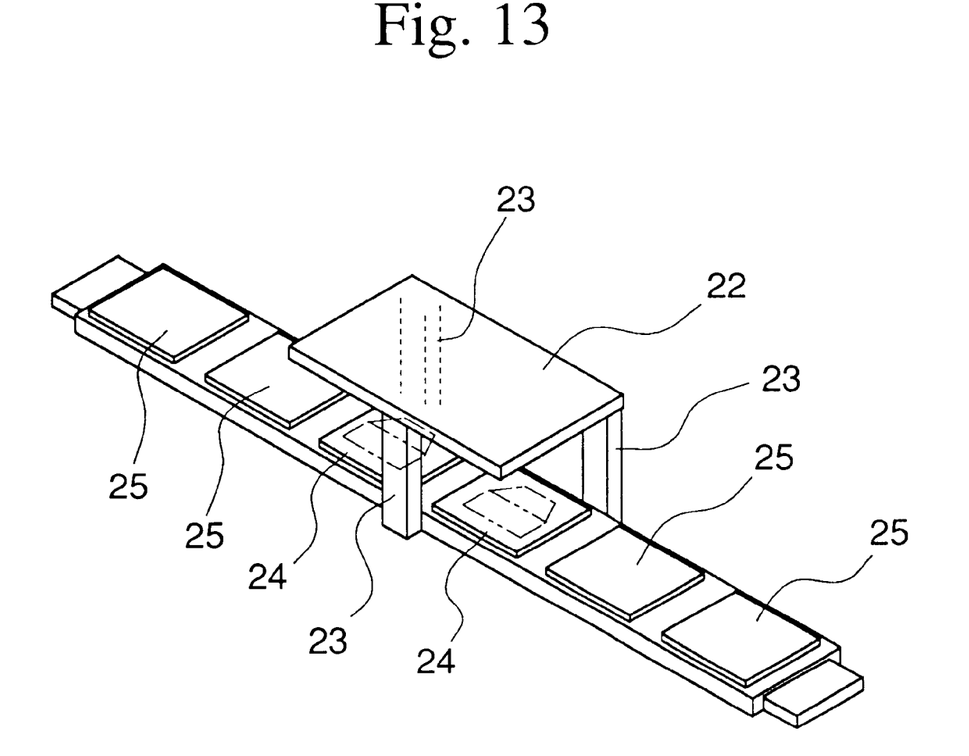
FIG. 13 is a perspective view showing a hemming press device.

At the delivery side of the marriage desk 16, there is provided a hemming input robot 21 shown in FIG. 12 for transferring the door assembly DA to the next stage of the hemming process E from the marriage desk 16. This hemming input robot 21 is arranged to allow it to move along the direction perpendicular to the production line so as to facilitate the input operation of the door assembly DA to the hemming pressing device 22 which will be described later. Since the hemming operation requires considerable time due to the nature of this operation, the input operation to the hemming pressing device 22 is executed alternately from the left to the right by a single hemming input robot 21, and the processing efficiency is higher than that obtained by providing two hemming input robots 21.

[Hemming Process E]

The hemming process E comprises a hemming pressing device 22 shown in FIG. 13. The hemming pressing device 22 is provided with two props 23 at the input side and one prop 23 at the delivery side. The hemming pressing device 22 is provided with hemming molds 24 for mounting the left and right door assemblies DA as well as hemming molds for exchange 25 so as to be input along the direction perpendicular to the production line. The two wide opened props 23 at the entrance side prepare an input space allowing easy input of the door assembly DA after the marriage, and one prop at the exit side prepares a preferable layout for the two hemming delivery robots used in the hemming delivery process F by providing a sufficient turning space of the robot arm and a sufficient space for delivery of the door assemblies DA.

The hemming process E integrates both left and right door assemblies by hemming the periphery of the door skin to the periphery of the door panel.

[Hemming delivery process F]

Figure 14:
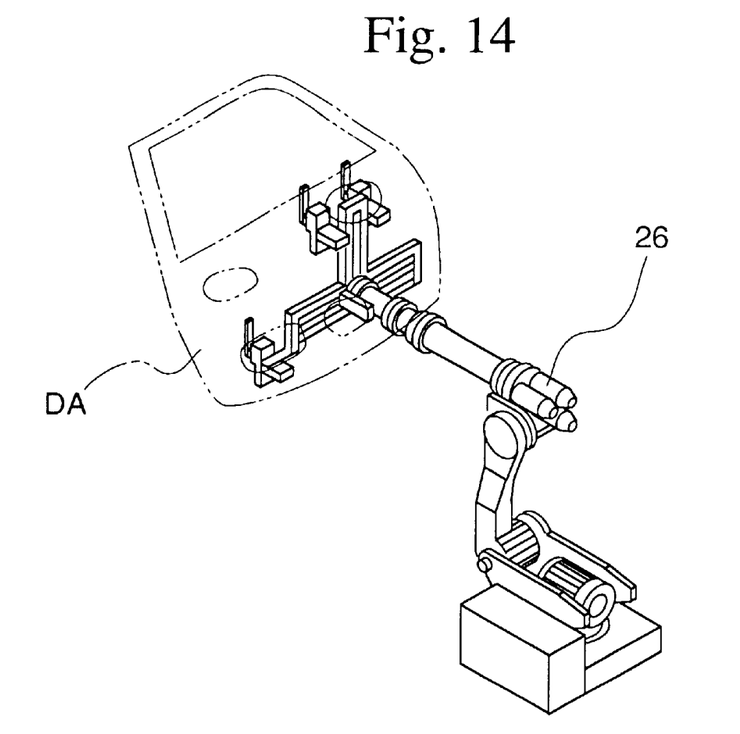
FIG. 14 is a perspective view showing a hemming delivery device.
Figure 15:
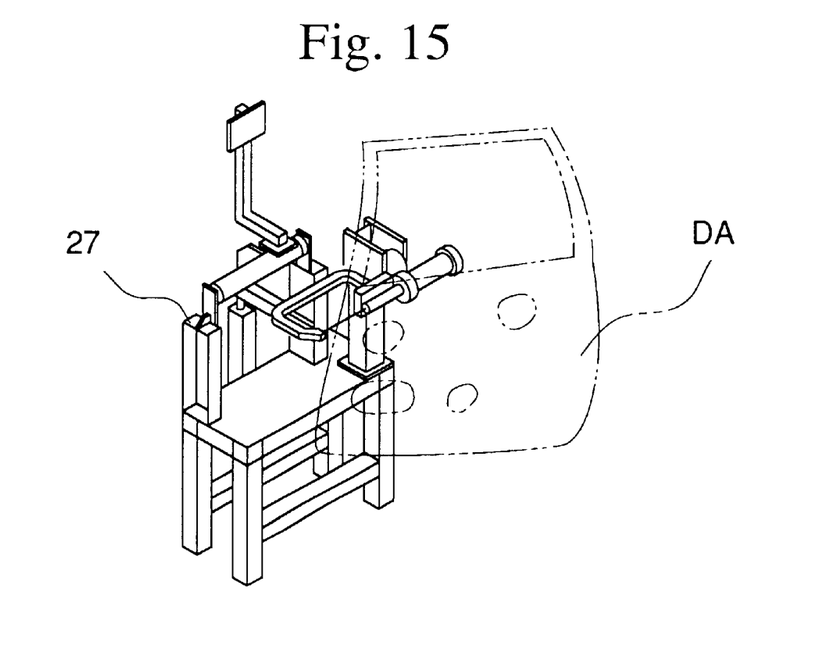
FIG. 15 is a perspective view showing an indirect welding device.
Figure 16:
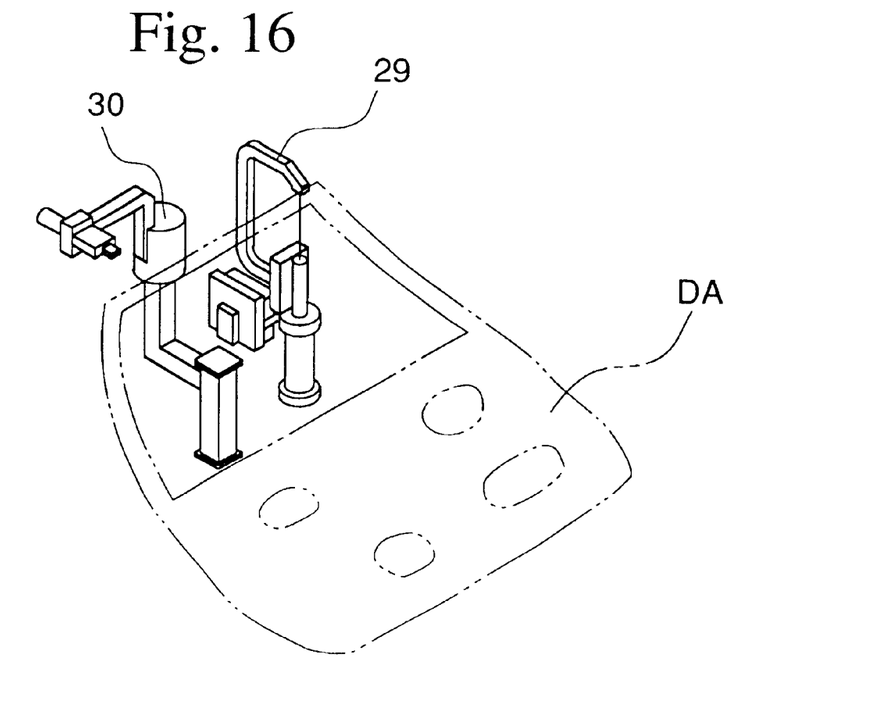
FIG. 16 is a perspective view showing a incremental spot welding gun and a tip dresser.

The hemming delivery process comprises two hemming delivery robots shown in FIG. 14 for delivering the left and right door assemblies integrated by the above hemming pressing device 22. On the transfer locus of each hemming delivery robot 26, the indirect welding device 27 shown in FIG. 15 an incremental spot welding gun 29 and a tip dresser 30, and a temporary mounting desk 31 are arranged.

Therefore, the door assembly DA held by the hemming delivery robot 26 is subjected to welding by the indirect welding device 27 and incremental welding by the incremental spot welding gun 29 before the door assembly is mounted on the temporary mounting desk 31.

This hemming delivery process F also comprises a robot handling jig magazine 9B having the same structure as that shown in FIG. 6 for the hemming delivery robot 26.

Figure 17:
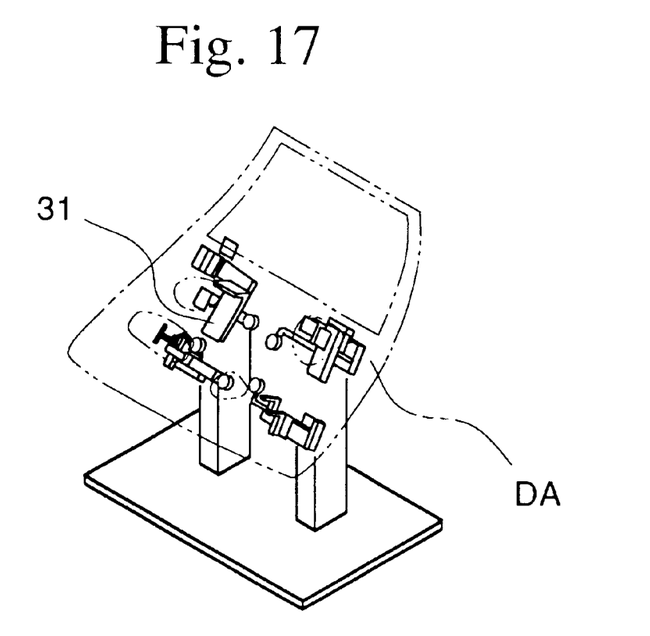
FIG. 17 is a perspective view of a temporary mounting desk.
Figure 18:
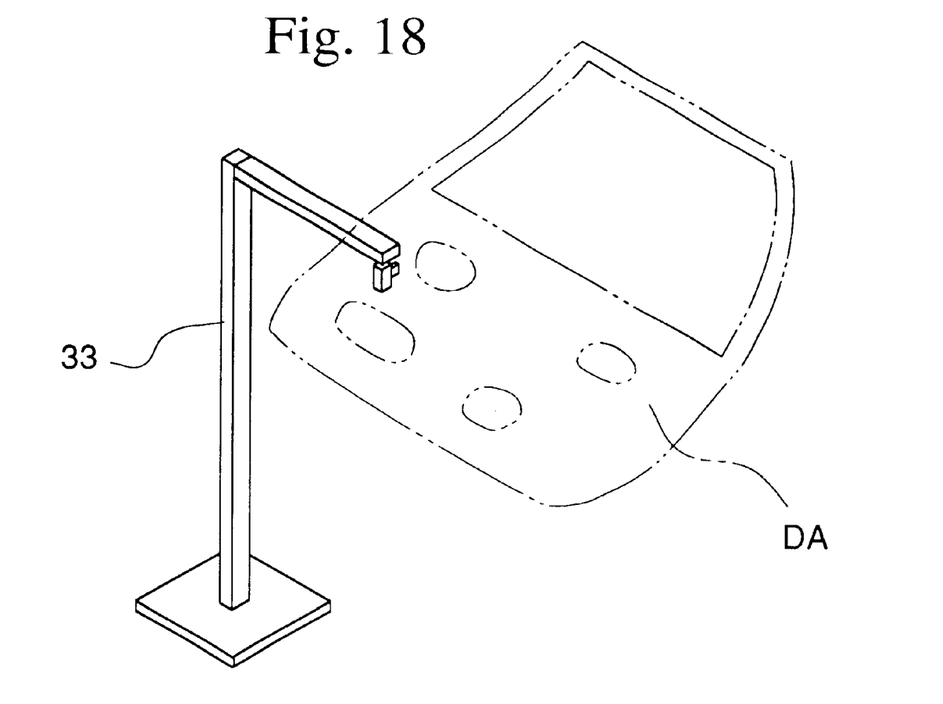
FIG. 18 is a perspective view showing a MIG welding device.

The left and right door assemblies transferred to the temporary mounting desk 31 are held by the material handling robot 34 used in the hinge fixing and delivery process G, described hereinafter, and the door assembly is subjected to a MIG welding using a MIG welding device 33 shown in FIG. 13 before transferred to the hinge fixing and delivery process G corresponding to the next process.

[Hinge Fixing and Delivery Process G]

Figure 19:
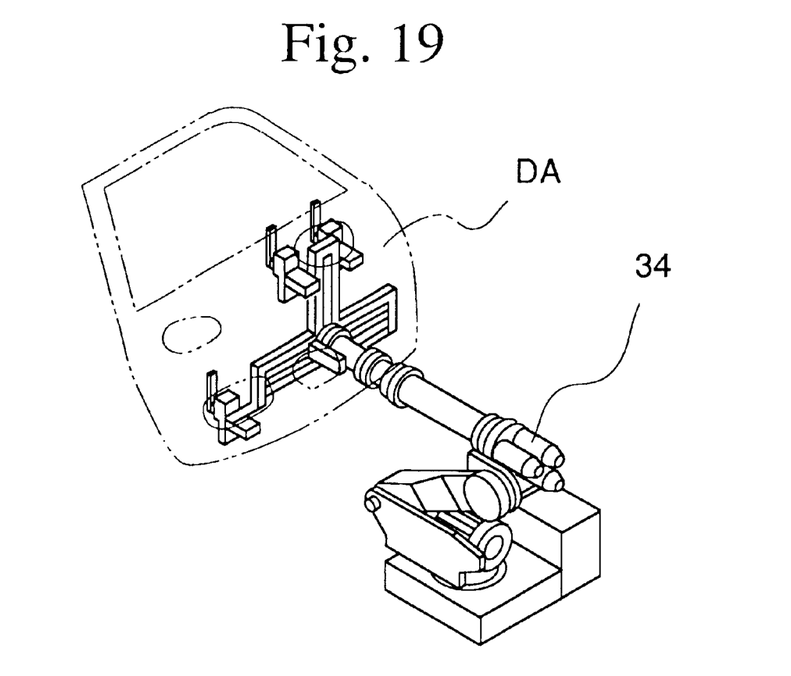
FIG. 19 is a perspective view showing a material handling robot.

The hinge fixing and delivery process G comprises a pair of material handling robots 34 for holding the door assembly as shown in FIG. 19. The material handling robots 34 in the hinge fixing and delivery process G also comprises a robot handling jig magazine 9C having the same structure as that shown in FIG. 6.

Figure 20:
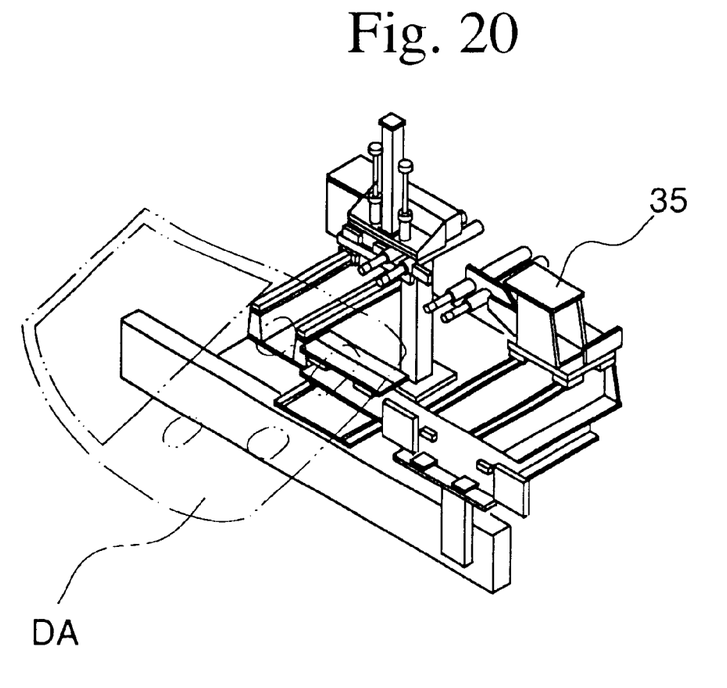
FIG. 20 is a perspective view showing a hinge fixing device.
Figure 21:
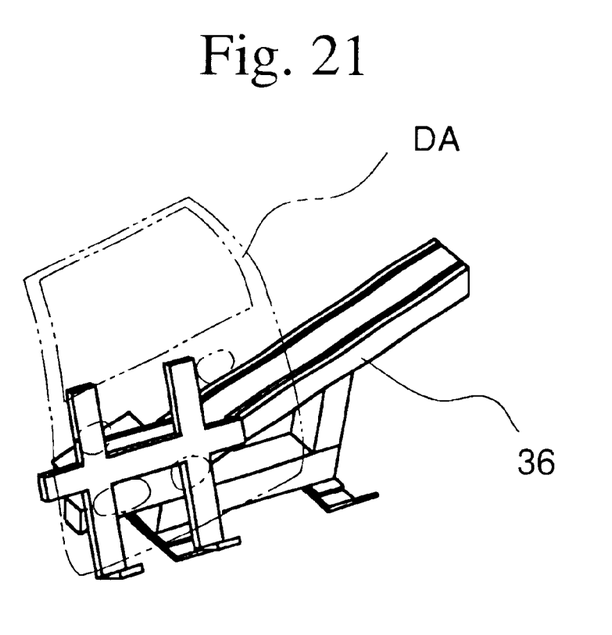
FIG. 21 is a perspective view showing a work delivery unit.

As shown in FIG. 20, at the delivery side of the material handling robot 34, a pair of the hinge fixing device 35 is provided for tightening the hinge to the door assembly DA while the door assembly is held by the material handling robot 34. The hinge is fixed to a predetermined location of the door assembly DA by use of the hinge fixing device 35 and the hinge is then tightened using a nut-runner in the hinge fixing device 35. The door assembly DA is then delivered to the outside of the door production line by an operator S through a work delivery unit 36 and transferred to the white body assembly line (not shown).

According to the above described embodiment, it becomes possible to produce the left and right door assemblies by one line simultaneously, in other words, at the same time. Thereby, it is possible to supply the left and right front door assemblies DA to the white body assembly line at the same time.

The left and right door panels DA are alternately processed by the work input device 3 in the work tack welding process A, by the temporary mounting desk 11 in the incremental welding process B and by the hemming input robot 21 in the door skin input and sealing process D, the cost of equipment of the production line according to this embodiment is lower than the case of providing two lines.

Production by one line is carried out by processing one of the two types of door panels while the other one is transferred to the next process. Accordingly, the lost time for the material transfer in the case of the two line production can be retrieved in the single line production as processing time, which results in improving the total production time, the productivity, and in reducing the number of operators.

Furthermore, as shown in the case of the work input device 3, the loss time has been effectively eliminated by combining the time consuming work input operation of the left and the right door panels with the tack welding operation which is also considerably time consuming.

According to the present embodiment, since the left and right door assemblies are produced by one line, it is not necessary to execute the sophisticated operation for matching both lines, compared to the case of providing two separated lines for the left and right door assemblies. The quality such as the dimensional accuracy of the jigs and molds for both of the left and right door assemblies are controlled under the same conditions, so that the left and right door assemblies can be maintained at the same and high quality level.

By changing only jigs and molds, such as the jigs, work holding fingers of various robots, marriage molds, and hemming molds, it is possible to change the type of door assembly. Therefore, the production line according to the present embodiment is provided with flexibility suitable for multi-product and low quantity production.

The present invention is not limited to the above-described embodiment, and can be applied to the production of the rear doors. In the above-described embodiment, although a type of the door assemblies which uses a separate sash member for welding to the door assembly is described, the present invention can be applied to a full-door type door in which the sash member is integrated with the door panel.

The production line according to the first aspect makes it possible to assemble a pair of left and right works simultaneously by one line through transfer, processing, and delivery portions to the left and right door assemblies for delivering to the white body assembly line.

The production line according to the second aspect makes it possible to assemble the left and right door assemblies very efficiently, since the left and right works are mounted alternately on a first jig by turning the turntables, and when one of the left or right works are delivered after welding by the welding robot, another work is supplied by the turning of the turntable for being subjected to welding.

The production line according to the third aspect makes it possible to process one of the left and right works, while transferring another one of the left and right works in the incremental welding process, in the marriage process and in the hemming process, respectively. Since the respective transfer periods of these processes are loss periods in the production line, elimination of the loss time effectively improves the productivity.

Formation of the production line according to the fourth aspect makes it possible to reduce the assembly period of both left and right front door assemblies or both left and right rear door assemblies. Furthermore, the above production line makes it possible to ensure the dimensional accuracy of these door assemblies, which is desirable because these door assemblies turn out to form part of the outer panel which determines the quality of the car appearance.

The production line according to the fifth aspect makes it possible to assemble the left and right door assemblies in one line by combining the inner panel member or an outer panel member of the front or rear door with various welding parts comprising a door sash member or a door hinge mount reinforcing member.

What is claimed is:

1. A production line of a car component for manufacturing a pair of left and right car components of a car body comprising:

a work supplying portion comprising a turntable for alternately supplying two types of work;

transfer and processing devices for processing a first one of the works while transferring the second one of the works, the transfer and processing devices including:
material handling robots for transferring the works, work mounting desks, and processing machines for processing the works;
wherein the work mounting desks and the processing machines are arranged on movement loci of the material handling robots and the production line is formed into a linear line up to a work delivery portion; and
wherein transfer of the works is carried out by the handling robots and processing of the works is carried out by the processing machines.

2. A production line of a car component according to claim 1, wherein said work supplying portion turntable can turn to a work input portion, and first jigs for mounting the left and right works and second jigs for positioning and attaching welding parts to be welded to the left and right works, wherein said turntable and first and second jigs constitute a work tack welding process together with welding robots arranged around said turntable.

3. A production line of a car component according to claim 1, wherein said transfer and processing portion comprises an incremental welding process for incremental welding of said first work and said welding parts at the tack welded state, a marriage process for combining said first work with the second work to be integrated with said first work, and a hemming process for integrating said first and second works by bending either one periphery of said first and second works.

4. A production line of a car component according to claim 1, wherein said car component comprises a pair of front doors or a pair of rear doors.

5. A production line of a car component according to claim 4, wherein said two types of work comprises an inner member or an outer member of the front door or rear door, said welding parts comprise a door sash member or a door hinge mount reinforcing member, and said attachment member comprises an inner member or inner member of said front door or said rear door.

* * * * *